June 12, 1956  E. A. WILCKENS ET AL  2,749,868
EJECTOR MECHANISM FOR CAP ASSEMBLY APPARATUS
Filed Aug. 10, 1951  3 Sheets-Sheet 1
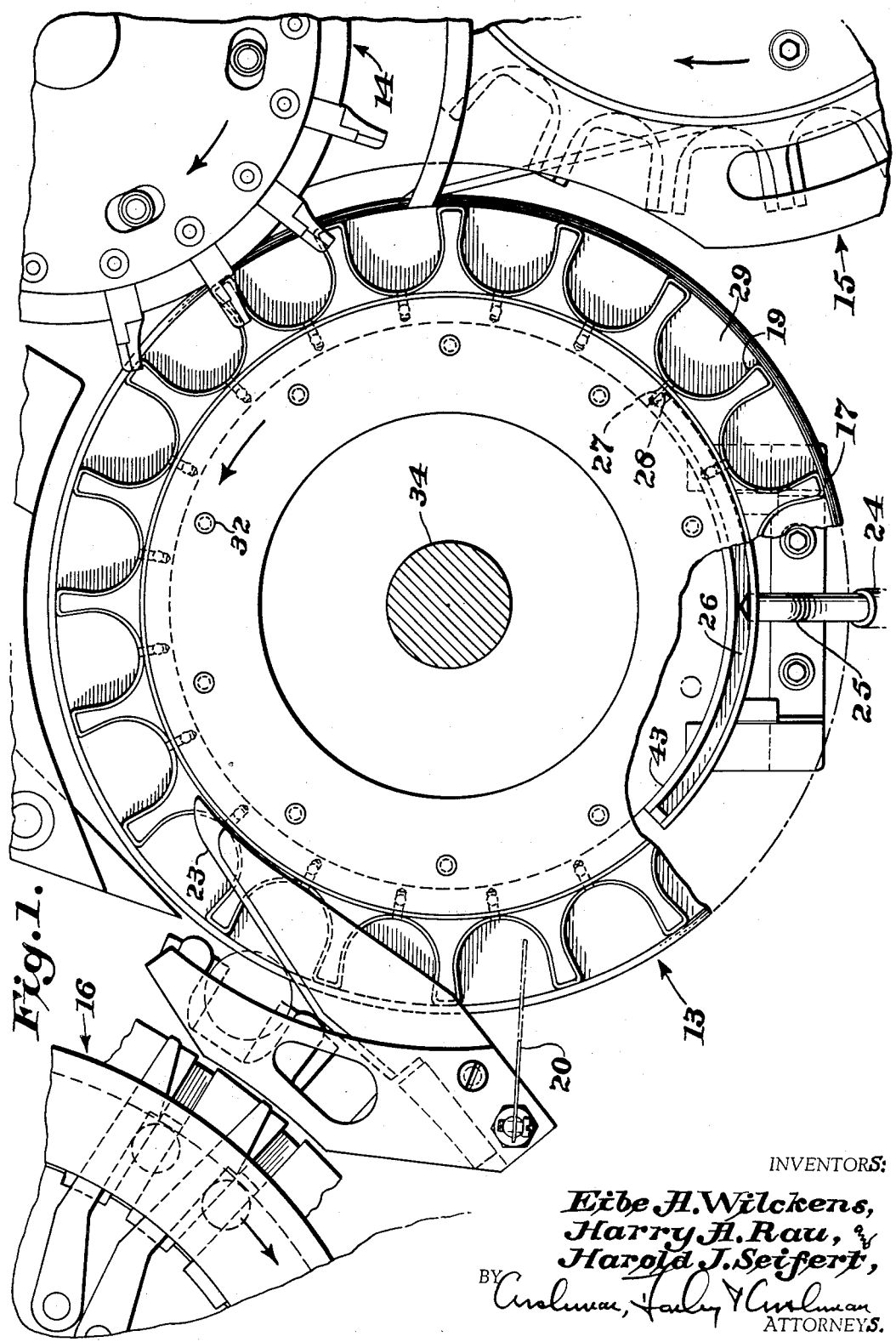
INVENTORS:
*Eibe H. Wilckens,*
*Harry H. Rau,*
*Harold J. Seifert,*
BY
ATTORNEYS.

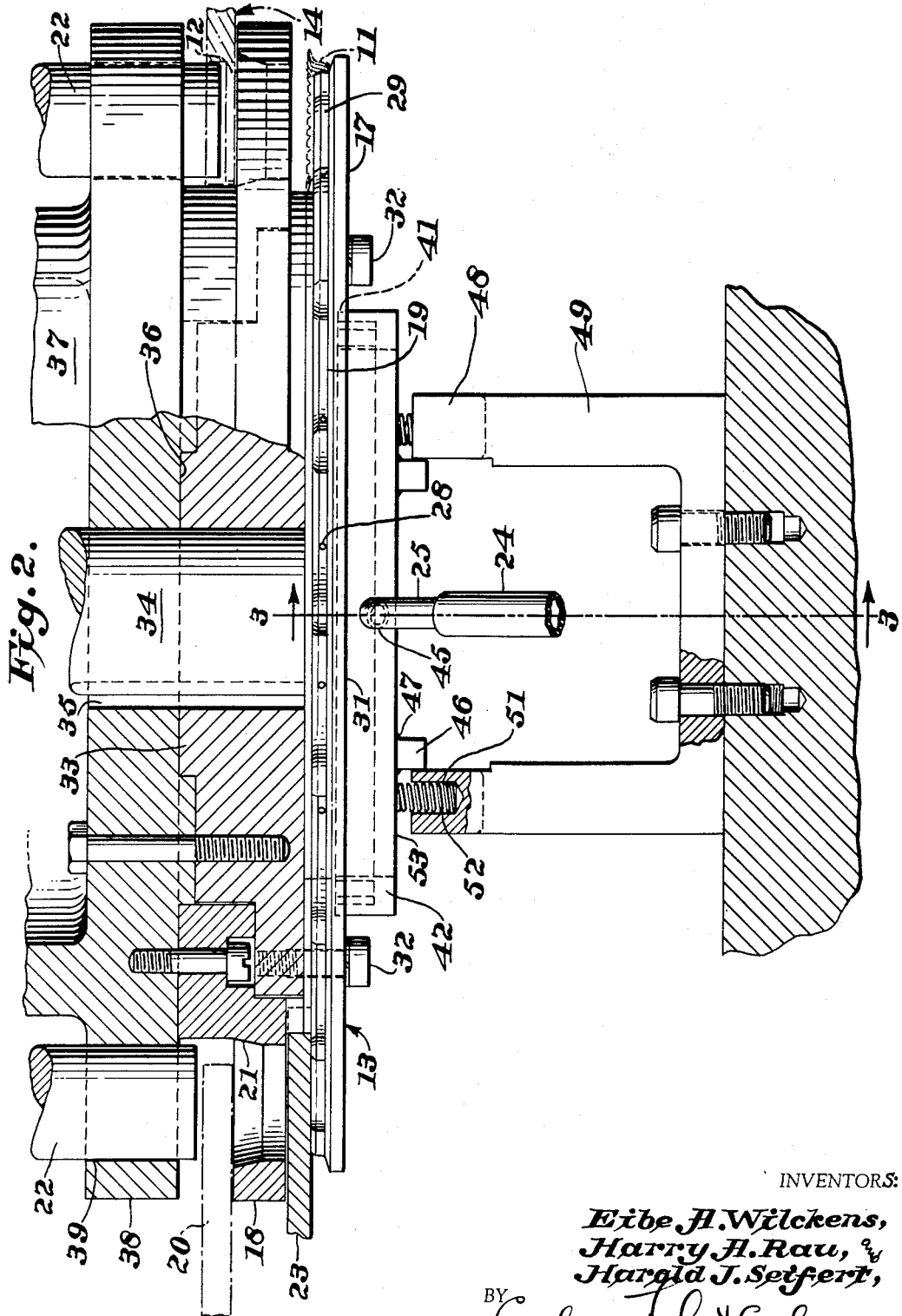

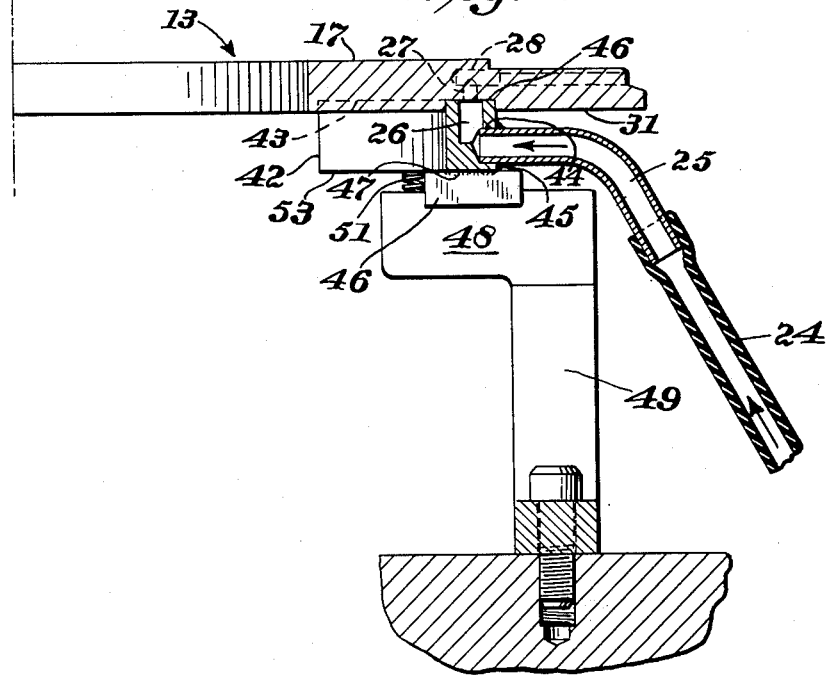
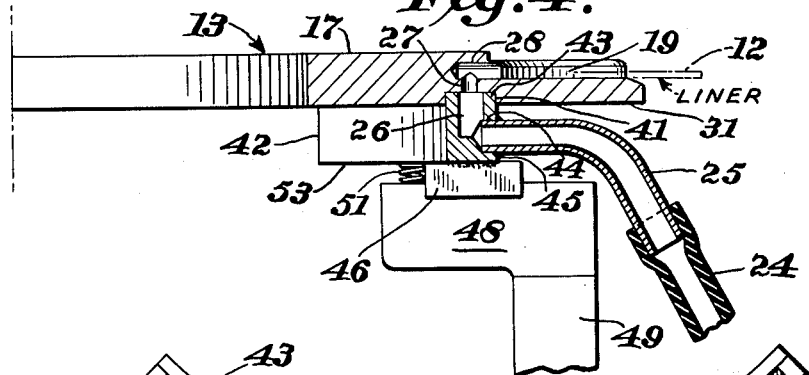
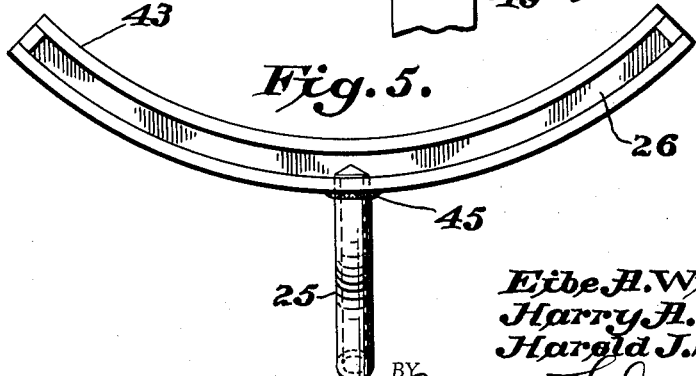
INVENTORS:
Eibe A. Wilckens,
Harry A. Rau,
Harold J. Seifert,
BY Cushman, Darby & Cushman
ATTORNEYS.

United States Patent Office 2,749,868
Patented June 12, 1956

2,749,868

EJECTOR MECHANISM FOR CAP ASSEMBLY APPARATUS

Eibe A. Wilckens, Harry A. Rau, and Harold J. Seifert, Baltimore, Md., assignors to Crown Cork & Seal Company, Inc., Baltimore, Md., a corporation of New York Application August 10, 1951, Serial No. 241,186

1 Claim. (Cl. 113—80)

This invention relates generally to ejector mechanism for cap assembly apparatus.

More particularly, the instant invention relates to apparatus for the continuous production of completely assembled caps for containers, such caps customarily comprising a shell and a cushion liner of any material suitable for the purpose such, for example, as a metallic material for the shell and a cork-like material for the liner. The present invention further includes apparatus for assuring a complete removal of any foreign material such as stray liners or particles thereof from the assembling apparatus to thereby eliminate possibility of damaged shells during the assembly operations of succeeding cycles of operation.

Heretofore, difficulty has been experienced during the operation of machines customarily employed for the manufacture of container caps in that while ordinarily a shell is in position on the assembly dial of such a machine to receive its liner when the latter is fed thereto by the liner dial, occasionally, as when the apparatus is slightly out of adjustment, a liner is delivered to the assembly dial at a time when no shell is present to receive the liner. This undesirable situation could result in an accumulation of stray liners on the assembly dial and mutilation of shells.

Accordingly, one of the objects of the instant invention is the provision of an assembly dial and apparatus associated therewith so constructed and arranged as to remove any stray liner material or any other foreign body present on the assembly dial prior to the completion of each revolution thereof.

Another object of the present invention is to provide an assembly which will substantially eliminate material waste as a result of maladjustment of the apparatus utilized to feed the assembly dial.

Still another object is the provision of an assembly dial for a rotary cap assembler which materially increases the rate of production of caps as a result of the elimination of the tendency of the apparatus to jam following an accumulation of foreign bodies such, for example, as stray liner material on the assembly dial thereof.

With the above and other objects in view that will appear hereinafter, the nature of the invention will be more fully understood by following the detailed description, the appended claim, and the several views illustrated in the accompanying drawings, wherein like reference numerals refer to like parts and:

Figure 1 is a top plan view of the lower flange assembly dial of the instant invention partially broken away to show a portion of the air blast means of the present invention and also includes a partial top plan view of the liner shell and transfer dials, these latter dials respectively being only partially shown to illustrate the manner in which the various dials cooperate with one another;

Figure 2 is an elevational view partially shown in section of the assembly dial and apparatus associated therewith which will be more fully described hereinafter;

Figure 3 is an elevational view in section as viewed along section line 3—3 of Figure 2 and disclosing the relative positions of the lower flange of the assembly dial and the means through which a pressurized fluid is adapted to be supplied thereto;

Figure 4 is a view similar to Figure 3 with the exception that the assembly dial is shown in a position of rotation slightly advanced from the position thereof shown in Figure 3; and Figure 5 is a top plan view of a portion of the ejecting means employed for the purpose of removing any foreign body from the surface of the lower flange of the assembly dial of the instant invention.

The machine illustrated in the drawings is intended for assembly of crown-type bottle caps. As is shown in Figure 2, such caps comprise a metal shell 11 and a liner 12, the liner usually being formed of a cork disk.

The construction and operation of the preferred embodiment of the invention disclosed herein may be generally described as follows: As is indicated in Figure 1, a rotary assembly device of the type disclosed in the application having Serial No. 131,554, filed December 7, 1949, by Eibe A. Wilckens et al., is provided with an assembly dial 13, a liner feeding dial 14, a shell feeding dial 15, and a transfer dial 16.

As is best indicated in Figure 1, the assembly dial 13, the liner feeding dial 14, and the shell feeding dial 15 have vertical axes of rotation arranged at the apices of a triangle. The assembly dial 13, as illustrated in Figure 2, includes a lower table or flange 17 upon which the shell feeding dial 15 will deposit shells 11, and an upper flange 18 to receive liners 12 from the liner feeding dial 14. The upper flange 18 is provided with a circumferential series of tapered apertures 21. Liner feeding dial 14 positions the liners 12 upon flange 18 in alignment with these apertures so that the liners may drop into the apertures. The shells 11 are sequentially placed in pockets or recesses 19 on the lower flange 17 in vertical alignment with the apertures 21 in the manner described in said application. A series of plungers 22 included in the assembly dial mechanism are reciprocated in the apertures 21 to force the liners downwardly through the apertures 21 and into the shells 11.

The caps formed by assembly of the shells 11 and the liners 12 are stripped from the lower flange of the assembly dial by a fixed stripper plate 23, Figure 1, which moves the assembled caps into pockets of the transfer dial 16. For a more complete description of the operation of that portion of the present invention which relates to the production of the finished caps reference should be made to the application hereinbefore mentioned.

When the assembly dial nears the completion of each revolution thereof, any foreign material present on the surface of each recess 19, such, for example, as stray liner material will be forceably ejected therefrom by the application of compressed air through the hose 24, the connecting elbow conduit 25, chamber 26, vertical passage 27 and a radial passage 28.

The peripherally located chamfered recesses or pockets 19, which are best viewed in Figure 1, may be formed in any suitable manner such, for example, as by milling such recesses in the periphery of the lower flange 17 of the circular assembly dial. These recesses, as shown in the preferred embodiment of the present invention are half circular in shape, it being understood, however, that recesses having other shapes may be employed if it is found desirable to do so. The innermost wall portion of each recess is provided with a radial passage 28 which is drilled radially inwardly from the innermost portion of the recess. A vertical passage 27 which is drilled from the underside of the lower flange 17 is provided so as to effect a path for fluid communication between the floor 29 of each of the recesses and the undersurface 31 of the lower flange.

Referring now to Figure 2, it will be observed that the lower flange 17 of the assembly dial 13 is rigidly secured by bolts 32 to a hub element 33 secured to a driving shaft 34 by the keyed connection 35.

The upper flange 18 of the assembly dial is provided with a plurality of peripherally spaced tapered apertures 21, hereinbefore mentioned, and is rigidly secured to the bottom surface 36 of a turret 37, also fixed to shaft 34 and hub element 33. An integral guide flange 38 having a plurality of circumferentially spaced guide apertures 39 extends laterally outward from the bottom portion of the turret 37. The guide apertures are so located in the guide flange as to be in vertical alignment with the aforementioned tapered liner apertures 21 and the shell pockets 19 and are respectively adapted to guide a plurality of plungers 22 into apertures 21 and pockets 19 during that portion of the operating cycle in which assembled caps are produced. The plungers are actuated by a mechanism forming no part of this invention and which, therefore, is not shown.

Occasionally pieces of the cork are sheared off the liners by the descending plungers. Should these pieces of cork remain on top of the flange 18, the next liner to be deposited on the flange by the liner feeding dial 14, at the particular aperture 21 where a preceding liner was sheared, would push the piece of cork ahead of it through the aperture and into the shell located in the recess 19 directly below the aperture. Consequently, when the cap would be employed as a closure for a bottle, a defective seal would be formed as a result of the presence of the stray piece of cork beneath the liner.

The possibility of the existence of such an unsatisfactory condition is eliminated by the provision of the wiper blade 20, shown by broken lines in Figures 1 and 2. Wiper blade 20 may be mounted in any convenient manner and is positioned so as to wipe the top surface of flange 18 at a position between the stripper plate 23 and the arcuate shoe at the ejector station, hereinafter described. The provision of wiper blade 20 assures that any particle of cork resting on the top surface of flange 18 will be wiped into one of the apertures 21 and will fall into the recess 19 therebelow. Since the wiper blade is located ahead of the ejector station, any such particle of cork will be ejected from the recess by the air blast in a manner which will become readily apparent as the description proceeds.

As best shown in Figures 3 and 4, the undersurface of the assembly dial 13 is provided with a circular groove 41 within which a stationary arcuate shoe 42 is resiliently urged. The arcuate shoe 42 is provided with an arcuate upstanding shoulder 43 adapted to slidably engage the bottom wall surface of groove 41. A vertical, arcuate chamber or groove 26 is provided in shoe 42 and extends substantially the entire length of the shoe. A connecting elbow conduit 25 is inserted into a radial hole 44 in the lower portion of the shoe and is secured therein by any suitable means such, for example, as by welding 45. The radial hole 44 intersects the lower portion of the vertical chamber 26 to thereby provide a means for connecting the aforementioned passages 27 and 28 in the assembly dial to a source of fluid under pressure during the time interval that the vertical passage 27 is in registry with chamber 26.

The shoe 42 is secured to a lug 46 by welding indicated at 47. The lug 46 is positioned to engage the horizontal arm 48 of supporting bracket 49 to thereby maintain the shoe stationary. A plurality of springs 51 are seated within a spring slot 52 drilled into the upper surface of the horizontal arm 48 of the supporting bracket and compressively engage the lower surface 53 of the shoe 42 for the purpose of resiliently urging the upstanding shoulder 43 of the shoe within the circular groove 41 on the undersurface of the assembly dial.

It will be observed that in Figures 3 and 4 the assembly dial 13 is in such a position that the vertical chamber 26 within the shoe is in registry with a vertical passage 27 in the assembly dial, the assembly dial having been rotated a sufficient extent to effect such registry. Until such registry is accomplished, any stray liner, such as that shown at 12 in Figure 4, will remain on the assembly dial. When registry between the aforementioned passage 27 and groove 26 is effected, the air blast will blow off such stray liner or liner material, as is best shown in Figure 4.

Although the fluid utilized has been described as being compressed air, it will be readily apparent to those skilled in the art that any other fluid found suitable for the purpose may be utilized. Furthermore, it will be readily appreciated that instead of fluid under pressure, a vacuum may be found desirable to produce a pressure differential for the purpose of removing stray liner material.

Briefly stated in summary, the present invention contemplates the provision of new and improved mechanism for the removal of stray liner material or other foreign material from the recesses of the assembly dial of a rotary cap assembling machine during a portion of the cycle of operation thereof subsequent to the point at which the assembled caps comprising a shell and a liner have been removed from the assembly dial.

The terminology used in the specification is for the purpose of description and not of limitation, the scope of the invention being indicated in the claim.

What is claimed as new and desired to be secured by Letters Patent of the United States is:

In a closure assembly apparatus, a rotatably mounted circular element including a horizontal circumferentially extending flange, said flange being provided with circumferentially spaced pockets opening to the upper surface and periphery thereof, said flange including a plurality of air passages extending between the inner portions of the respective pockets and an inner coaxial face of said element, said element including a second horizontal circumferentially extending flange substantially coextensive with and above said first flange, said second flange being provided with vertical apertures extending therethrough from its upper surface, a plurality of plungers vertically reciprocable in said element to have their lower faces move from a position above said second flange and through the corresponding aperture in the latter to assemble liners and shells, means to position cap shells in the pockets of said first flange, means to position cushion liners upon said second flange in alignment with the apertures thereof, and then, in order, means to move said plungers downwardly through the apertures in said second flange and then raise said plungers, means to then remove assembled shells and liners from the pockets of said first flange, wiper means bearing upon the upper surface of said second flange to wipe liner fragments therefrom and into its apertures and the pockets of said first flange, and relatively fixed means bearing on said inner coaxial face of said element to supply compressed air to the passages and pockets of said first flange to remove liners and liner fragments therefrom.

References Cited in the file of this patent
UNITED STATES PATENTS

| 1,931,294 | Nagy | Oct. 17, 1933 |
| 2,282,959 | Gibbs | May 12, 1942 |
| 2,331,269 | Frank | Oct. 5, 1943 |